United States Patent [19]

Burdorf et al.

[11] 4,093,150
[45] June 6, 1978

[54] METHOD AND APPARATUS FOR PROVIDING CONSTANT MAGNETIC TAPE TENSION

[75] Inventors: Donald L. Burdorf, Newport Beach; James Bjordahl, Arcadia, both of Calif.

[73] Assignee: BASF Aktiengesellschaft, Ludwigshafen, Germany

[21] Appl. No.: 805,654

[22] Filed: Jun. 13, 1977

[51] Int. Cl.$^2$ .......................... G03B 1/04; G11B 15/32
[52] U.S. Cl. ....................................... 242/192; 360/71
[58] Field of Search ............... 242/192, 204, 206, 208, 242/210; 360/71, 73

[56]  References Cited
U.S. PATENT DOCUMENTS

| 3,370,803 | 2/1968 | Newell | 242/192 |
| 3,921,933 | 11/1975 | Rotter et al. | 242/192 |
| 3,951,356 | 4/1976 | Davis, Jr. | 242/192 |
| 3,960,342 | 6/1976 | Furst | 242/192 |
| 4,018,402 | 4/1977 | Burdorf | 242/192 |
| 4,049,216 | 9/1977 | Burdorf et al. | 242/192 |

Primary Examiner—Leonard D. Christian
Attorney, Agent, or Firm—Keil, Thompson & Shurtleff

[57]  ABSTRACT

An improved method and apparatus for generating constant tape or web tension in a transport system of the type wherein the supply and take-up reels are simultaneously driven by surface engagement with a capstan. Uniform tension is maintained throughout the entire tape pack by balancing the supply reel peripheral velocity rate of change occurring during the transport operation to the greater, but correspondingly sloped, take-up reel peripheral velocity rate of change. This balancing of the peripheral velocity of the supply and take-up reels is achieved through utilization of a constant braking system that combines the effects of torque and bias forces acting on the supply reel so as to produce constant tape tension in the take-up reel.

14 Claims, 2 Drawing Figures

METHOD AND APPARATUS FOR PROVIDING CONSTANT MAGNETIC TAPE TENSION

INTRODUCTION

The present invention relates generally to a tape or web transport system and, more particularly, to a method and apparatus for providing constant tape tension in a system of the type wherein the supply and take-up reels are simultaneously driven by surface engagement with a capstan. While the particular embodiment of the invention described and disclosed herein is designed to be utilized in a high-speed video tape recording system, it is to be understood that the present invention may be advantageously utilized in any system wherein it is desired to transport a tensioned web medium from a supply reel onto a take-up reel.

BACKGROUND OF THE INVENTION

In general, the proper operation of a tape or web transport system in which the supply and take-up reels are simultaneously driven by surface engagement with a driving capstan requires the presence of tension in the tape span between the supply and take-up reels. This tape tension permits the formation of a tape pack which will retain its physical shape without side support and which will also withstand the high speeds and rapid accelerations and decelerations normally associated with units of this type. In addition, it is desirable that the tension be maintained at a constant level in order to assure uniform contact between the recording or sensor head and tape surface so as to enable the transduction of a flutter-free signal.

An example of such a type of transport is disclosed in U.S. Pat. No. 3,921,933, the disclosure of which is incorporated herein by reference. The constant tape tension in that tape transport is maintained almost entirely by braking the reel serving as the supply reel. The braking causes the surface velocity of the capstan and that of the unbraked take-up reel to slightly exceed the surface velocity of the supply reel. To accommodate the difference in speed between the supply and take-up reels the interconnecting span of tape is forced to stretch, thus generating the desired tape tension.

As an alternative to supply reel braking, other tape transports have relied upon the differential deformation or progression phenomenon. The device disclosed in U.S. Pat. No. 3,370,803 is an example of such a tape transport. Tape tension is generated by using a capstan having a peripheral portion capable of elastic flow. By applying a greater force at the take-up reel/capstan interface than at the supply reel/capstan interface, the rate of local acceleration by elastic flow of the capstan material at the former will exceed that at the latter. The effect is to impart a slightly higher velocity to the take-up reel with the result that tension is generated in the tape between the supply and the take-up reels by introducing, as with supply reel braking, a velocity difference between the take-up and supply reels. However, it has been found that with both of these prior art methods of tape tensioning serious difficulties have been encountered in achieving constant tape tension throughout the entire transport operation. The primary source of these problems being the undesirable side effects caused by the continual change in the supply and take-up reel size diameter as the transport operation is carried out.

Therefore, in an attempt to overcome these difficulties, various methods have been developed combining the effects of progression and supply reel braking so as to achieve constant tape tension throughout the tape pack. For example, in U.S. patent application Ser. No. 574,958, filed May 6, 1975 now U.S. Pat. No. 4,018,402, the disclosure of which is incorporated herein by reference, the progression effect was combined with the effect of an automatic braking system wherein the braking force applied to the supply reel varied as a function of reel size diameter. However, in practice it has been found that this variable braking system is both expensive to manufacture and complicated to set up. These drawbacks are primarily attributable to the fact that a pair of unidirectional clutches are preferably utilized in the system which operate in conjuction with springs which must be precise in their operation over a wide extension distance. Furthermore, these springs must be balanced with respect to each other so as to accommodate the bidirectional operation of the machine.

An alternative method combining the effects of progression and supply reel braking to achieve constant tape tension throughout the tape pack is described in U.S. patent application Ser. No. 574,959, filed May 6, 1975 now U.S. Pat. No. 4,049,216, the disclosure of which is likewise incorporated herein by reference. In that disclosure, constant tape tension was maintained primarily by placing a flexible, but relatively inelastic, belt around the periphery of the resilient capstan. However, due to the greater torsional stiffness of the capstan periphery caused by utilization of this belt, it is difficult to generate "creep" effects, discussed in detail below, which obviate the problem of tape looping encountered with loosely wound initial tape packs.

BRIEF DESCRIPTION OF THE INVENTION

The present invention utilizes a unique, but simple and inexpensive, constant braking arrangement to avoid the above-discussed problems encountered with prior tape tensioning systems. The effects of the torque and bias forces acting at the contact interface of the supply reel which are caused through the action of the constant brake arrangement are combined so as to produce uniform tape tension throughout the transport operation by balancing the peripheral velocity rate of change of the supply reel against the greater, but correspondingly sloped, take-up reel peripheral velocity rate of change.

One of the principal advantages found with the present invention is that since the braking force acting on the supply reel is constant throughout the entire transport operation, a simple bi-directional braking system may be utilized which greatly reduces the parts and set-up costs required by the system.

In addition, since the torque and bias effects created by the constant braking force are applied to the supply reel irrespective of the condition of the tape pack, the problem of tape looping encountered with loosely wound supply tape packs is virtually eliminated.

DESCRIPTION OF THE PREFERRED EMBODIMENT

It is known that in a tape transport system wherein the supply and take-up reels are urged against a driving capstan having a peripheral portion capable of elastic flow, the velocity of these reels will be increased above that of the capstan. This phenomenon is generally referred to as the progression effect and is caused by the deflected surface of the capstan increasing in velocity as it flows about the supply and take-up reel interface thereby imparting a slightly higher velocity to these reels above that of the capstan during the tape transport operation.

Figure 1:
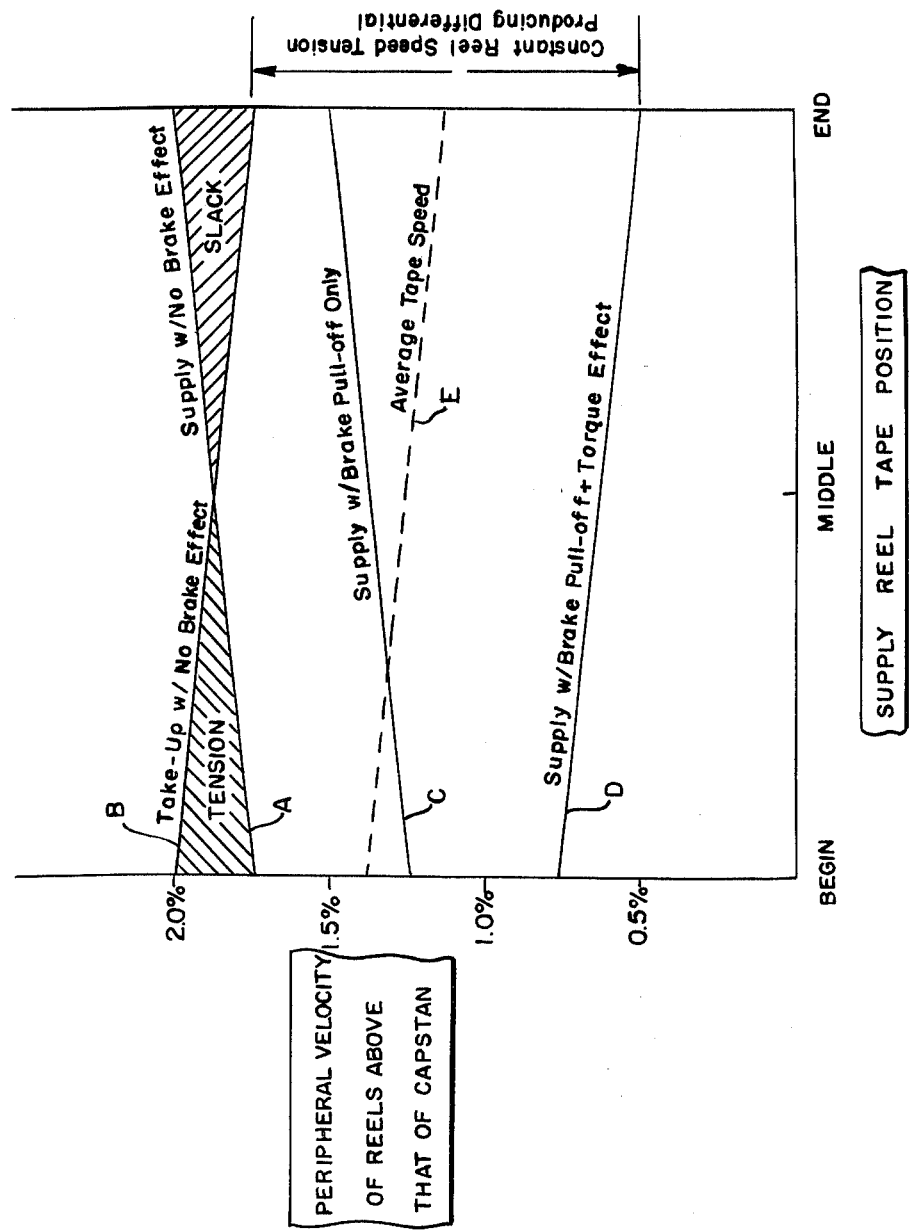
FIG. 1, is a reel velocity versus tape position diagram showing the effects of the various forces acting upon the supply and take-up reels during the transport operation when utilizing the present invention.

Line A of FIG. 1 illustrates the typical upwardly sloping plot of the increased peripheral velocity of the supply reel occuring during the transport operation due to the progression effect. Similarly, line B illustrates the corresponding downwardly sloping plot of the increased peripheral velocity of the take-up reel occuring during this same period.

The upward and downward slope of these reel velocity plots is caused by the continual change in the diameter of the reels as the tape is transported from the supply to the take-up reel. In general, the increase in reel velocity due to progression is directly proportional to the amount of deflection of the capstan resilient surface caused by the reel. Hence, with a constant compressive force being applied between the reel and capstan, the smaller contact area of a smaller diameter reel will cause slightly greater deflection of the capstan and a correspondingly greater increase in the peripheral velocity due to progression.

The sloping plots of the supply reel velocity (A) and take-up reel velocity (B) of FIG. 1 illustrate the effect of this change in velocity due to reel size diameter during the transport operation. As the velocity of the supply reel becomes greater and that of the take-up reel become lesser during the transport operation, the tape tension caused by the difference in velocity between the two reels will diminish until it becomes zero at the intersection of the sloping plots at the mid-reel tape position and will become a negative (slack producing) value beyond that point to the end tape position. If not compensated for, such slack would lead to tape loops being formed at the interface between the supply reel and capstan, particularly where the tape is not initially tightly wound on the supply reel prior to the transport operation.

Therefore, in order to produce a positive and uniform tape tension at all times during the transport operation, the decreasing slope of the supply reel must be compensated for in a manner such that the take-up reel will constantly run at a uniformly higher velocity than it. The present invention accomplishes this objective by utilizing a constant braking system that combines the effects of the torque and bias forces acting on the supply reel so as to generally lower the peripheral velocity of the supply reel below that of the take-up reel and change the slope of the supply reel velocity rate of change to match that of the take-up reel thereby maintaining a constant tape tensioning component in the system during the entire transport operation.

Figure 2:
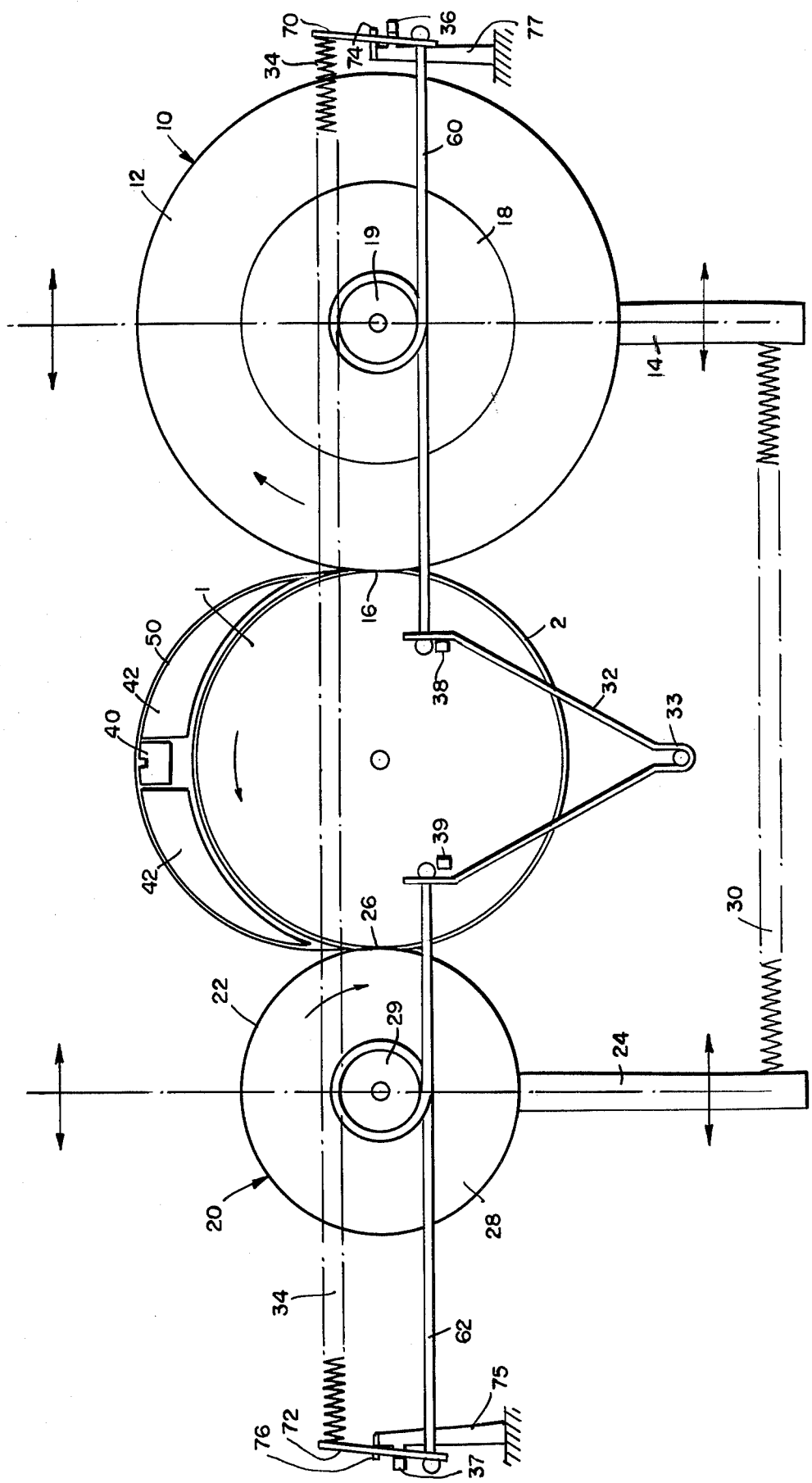
FIG. 2 is a schematic top view of a tape transport system constructed in accordance with an embodiment of the present invention.

FIG. 2 shows a schematic representation of a tape transport utilizing an embodiment of the constant braking system of the present invention. Capstan 1 is driven by a motor (not shown) which in turn is mounted on the base of the assembly. The peripheral portion 2 of the capstan is made of a resilient material, such as rubber, which is capable of elastic flow.

Capstan 1 simultaneously drives supply reel 10 and take-up reel 20 (when considered in relation to the rotation of the reels and capstan as indicated by the arrows) by surface engagement of resilient portion 2 with the tape packs wound thereon. As depicted in FIG. 2, the tape transport operation is in the beginning position with a large tape pack 12 being wound on the supply reel 10 and a small tape pack 22 consisting of only a few revolutions of tape being wound on take-up reel 20.

Supply reel 10 and take-up reel 20 are rotatably mounted on moveable carriages 14 and 24 respectively which allow an interconnecting biasing spring 30 to urge them against capstan 1 with equal compressive force. This arrangement for equally biasing the supply and take-up reels against the resilient portion 2 of the capstan results in the above-described progression effects upon the peripheral velocities of these reels.

Also illustrated in FIG. 2 is a transducer head 40 mounted between tape guides 42 over which the tape 50 is transported on its way from the supply to the take-up reel. It has been found that when using ¼ in. wide tape in the operation of high-speed video recorders constructed in accordance with the present invention, it is desirable to maintain a tension component of approximately 2 oz. in the span of tape extending over the head between capstan/supply reel interface 16 and capstan/take-up reel interface 26.

Turning now to the unique constant braking system which comprises one of the principal inventive components of the present tape tensioning apparatus, a cord 60 is wound about supply reel hub 18 and a similar cord 62 is wound about take-up reel hub 28. One end of each cord is secured to a wishbone-type spring 32 which pivots about a fixed post 33. The other end of each spring is secured to one end of similar pivot levers 70 and 72 which are mounted at fulcrum points 74 and 76 on fixed posts 75 and 77 respectively. The other end of pivot levers 70 and 72 are connected together by means of coil spring 34. In this manner an interconnected, closed-loop braking system is created which will operate alternatively in an identical manner upon the supply and take-up reels upon reversal of the transport mechanism.

Mounted on fulcrum posts 75 and 77 are stops 36 and 37 which limit the outward movement of pivot levers 70 and 72 at the ends thereof which are attached to cords 60 and 62. Likewise, stops 38 and 39 limit the inward movement of the arms of wishbone spring 32.

In operation, the friction between turning supply hub 18 and cord 60 creates a force acting against coil spring 34 which pulls pivot lever 70 off of stop 36. The other end of coil spring 34 will be effectively grounded on the take-up reel side of the transport since, due to the rotational direction of take-up reel hub 28, only a small amount of force is transmitted to lever 72 through cord 62 and it will therefore pivot about fulcrum point 76 until it comes to bear against stop 37. In a similar fashion, the friction between turning take-up hub 28 and cord 62 creates a force acting against wishbone spring 32 which pulls it off of stop 39. The other leg of wishbone spring 32 will be effectively grounded at stop 38 due to the rotation of supply hub 18 acting on cord 60. It can be seen that in view of the symmetrical design of the embodiment of the apparatus depicted in FIG. 2, upon reversal of the tape transport direction, exactly the opposite sequence of operational steps and arrangement of forces will occur due to the positioning of the wishbone spring 32, the pivot levers 70 and 72 and interconnecting coil spring 34. Therefore, regardless of the tape transport direction, wishbone spring 32 and coil spring 34 will tension cords 60 and 62 in a constant and predictable manner throughout the entire transport operation.

In the preferred embodiment of the present invention, the supply reel 10 has a maximum diameter, including the tape pack 12 wound about it, of approximately 4 inches and the take-up reel 20 has a minimum diameter of about 2¼ inches. Coil spring 34 exerts a tension of approximately 450 gr. in the span of cord 60 between pivot lever 70 and supply reel hub 18. Wishbone spring 32 exerts a tension of approximately 80 gr., or about one-sixth the tension exerted by spring 34, in both the span of cord 60 between it and supply reel hub 18 and the span of cord 62 between it and take-up reel hub 28. When the tape transport is operating in the direction shown in FIG. 2, the tension in cord 62 between take-up reel hub 28 and pivot lever 72 will be about one-thirtysixth the amount of tension in cord 60 between supply reel hub 18 and pivot lever 70. Upon reversal of the tape transport in a bi-directional system, these forces will also exactly reverse themselves. In addition, biasing spring 30 will exert a constant inwardly directed force of approximately 1400 gr. on both supply and take-up carriages 14 and 24 regardless of the tape direction.

As is illustrated in FIG. 2, cords 60 and 62 may be wrapped around a shaft or turned down portion 19 and 29 of supply hub 18 and take-up hub 28 respectively in order to achieve the desired bias and torque effects at the peripheral interface between the reels and capstan. It has been found that one complete wrap of cords 60 and 62, which may be made of an aramid fiber such as Kevlar or other similar suitable material, will produce satisfactory results without undue galling of the metallic shaft portions 19 and 29 of the hubs. In the preferred embodiment, shaft portions 19 and 29 are made of hardened steel and having a diameter of approximately ½ inch.

In such an arrangement, the torque T applied to the shaft of the supply reel is given by the formula:

$$T = (FA - FB) \cdot R$$

Where $FA$ is the tension in cord 60 between supply hub 18 and pivot lever 70, $FB$ is the tension in cord 60 between supply hub 18 and wishbone spring 32 and $R$ is the radius of shaft 19.

Furthermore, it is known that the relationship between forces $FA$ and $FB$ is given by the formula:

$$FA/FB = e^{\mu\theta}$$

Where $e$ is the natural logarithm (2.718 . . . ), $\mu$ is the coefficient of friction between cord 60 and shaft 19 and $\theta$ is the constant $2\pi$ radians which corresponds to one complete wrap of cord 60 about shaft 19.

Therefore, solving for FB, the following relationship is derived:

$$FB = FA/e^{\mu\theta},$$

and $$T = FA (1 - e^{-\mu\theta}) R$$

Hence, it can be seen from the above formula that the torque applied to shaft 19 is directly proportional to the component $(1 - e^{-\mu\theta})$ since FA is directly dependent on the force of coil spring 34 which will not change significantly during the life of the transport. Although the coefficient of friction $\mu$ will increase with use of the machine due to galling of the surface of shaft 19 by cord 60, due the exponential nature of $\mu$ in the above formula, the torque applied to the shaft will remain substantially constant regardless of the change in $\mu$. For example, a new transport will have a $\mu$ value of from about 0.3 to 0.4 which results in a value for the component $(1 - e^{-\mu\theta})$ of 0.85 to 0.92. The value of this component will approach its theoretical maximum value of unity as the value of $\mu$ increases with wear.

Although such effects on the torque force applied to shaft 19 could be eliminated by utilizing various known brake and clutch assemblies, the added cost of such devices is not necessary to the proper operation of the present invention since the torque force will only change an insignificant maximum amount of from 8 to 15 percent during the life of the transport due to the increase in the coefficient of friction between the braking cord and shaft with wear.

The essentially constant braking force applied to supply reel shaft 19 through cord 60 generates two important effects upon the periphery of the supply reel at the capstan interface.

The first of these is an outward bias effect wherein the supply reel will tend to be pulled away from the capstan against the force of biasing spring 30 due to the constant outwardly directed tension component present in cord 60 between shaft 19 and pivot lever 70. As was noted above, the amount the peripheral velocity of the supply reel is increased above that of the capstan due to progression is directly proportional to the amount of deflection of the resiliently deformable peripheral surface of the capstan caused by the supply reel. Hence, since the braking force imparted by cord 60 upon shaft 19 will decrease the amount of deflection of the capstan peripheral surface by the supply reel, the peripheral velocity of the supply reel above that of the capstan will be decreased during the transport operation. This bias effect is illustrated by the plot of line C shown in FIG. 1 wherein the peripheral velocity of the supply reel above that of the capstan is decreased by about 0.5 percent below that of the plot of line A which contained no braking component. Since the braking and pull-off force applied to shaft 19 remains constant during the entire transport operation, the peripheral velocity of the supply reel will be decreased a constant amount below that of the supply reel with no braking effect applied.

The second of these important effects generated by the constant braking force is a torque effect which reduces the peripheral velocity of the supply reel throughout the tape transport operation in direct proportion to the decreasing diameter of the tape wound thereon. Although the braking force applied to shaft 19 remains constant during the entire transport operation, the torque or resisting force imparted by this constant braking force to the supply reel at its interface with the capstan will increase in inverse proportion to the diameter of the supply reel due to the decreasing radius of the reel. In other words, in order to overcome the constant braking force applied to shaft 19 of the supply reel 10, a greater force must be imparted by the capstan to the peripheral surface of the supply tape pack at interface 16 as the radius or, in effect, the lever arm of the supply reel decreases during the tape transport operation.

Such resisting torque at the interface between the supply reel and capstan causes a second physical phenomenon affecting the flow characteristics of the resilient surface of the capstan about the contact portion of the supply reel commonly called "creep". Since creep tends to slow the peripheral velocity of the supply reel without any slip between the capstan and reel being induced, it will counteract the effect of progression upon the supply reel. In addition, the effect of creep upon the peripheral velocity of the supply reel is directly proportional to the amount of resisting torque present at the capstan/supply reel interface and, hence, will also be proportional to the decrease in diameter of the supply reel tape pack.

Therefore, it has been found that by properly selecting and balancing the variables which control the rates of progression and creep in the transport system, such as spring tensions, tape pack diameter and characteristics of the capstan resilient material, it is possible to easily alter the slope and plot of the supply reel peripheral velocity so as to match it to the greater, but correspondingly sloped, take-up reel peripheral velocity plot. The final plot of the supply reel peripheral velocity after both the brake pull-off and torque effects have been imparted by the constant brake system is illustrated in FIG. 1 as line D. The differential between this line plot and that of the take-up reel B produces a constant tape tension throughout the entire transort operation.

In practice, after slightly stretching the span of tape between the supply and take-up reel interfaces in order to obtain the desired 2 oz. tape tension, the system will equalize itself and an average tape speed for the peripheral velocities of the supply and take-up reels will be achieved. This average tape speed is represented by dashed line E in FIG. 1 and is caused by tape tension induced creep which equalizes the peripheral velocities of the reels by reducing the velocity of the take-up reel and increasing the velocity of the supply reel. The fact that the resulting average tape speed plot is not constant, but downwardly sloping during the transport operation, is not critical to maintaining uniform tape speed since the capstan motor may be electronically regulated by any one of numerous known servo control methods to correct for this constant speed variation.

Referring again to the preferred embodiment of the present invention shown in FIG. 2, although wishbone spring 32 will impart some undesirable reverse torque to take-up reel 20 during the transport operation, since it is a relatively low tensioning force by comparison to that imparted by coil spring 34 to the supply reel 10 (which is typically 6 to 10 times greater in value) its effect will be negligible upon the line plots shown in FIG. 1. Therefore, utilization of this wishbone spring arrangement has been found to be highly advantageous since it eliminates the need for one-way clutches in the transport apparatus at a significantly lower cost.

While several particular embodiments of the present invention have been shown and described in detail herein, it should be understood that various obvious changes and modifications thereto may be made, and it is therefore intended in the following claims to include all such changes and modifications as may fall within the spirit and scope of this invention.

What is claimed is:

1. An apparatus for generating constant tape tension in a tape transport system of the type wherein the supply and take-up reels are simultaneously driven by surface engagement with a capstan having a resiliently deformable peripheral surface, said apparatus comprising:

means for urging the supply and take-up reels against the peripheral surface of the capstan thereby causing the peripheral velocity of said supply and take-up reels to increase above that of said capstan;

means for imparting a constant braking force on said supply reel, said braking means generating bias and torque effects upon the periphery of said supply reel;

said bias effect uniformly reducing the peripheral velocity of the supply reel throughout the tape transport operation thereby creating a first tensioning component in the span of tape between said supply and take-up reels;

said torque effect reducing the peripheral velocity of the supply reel throughout the tape transport operation in direct proportion to the decreasing diameter of the tape wound thereon thereby creating a second tensioning component in the span of tape between said supply and take-up reels; and a means for balancing said first and second tensioning components of said constant braking means so as to match the supply reel peripheral velocity rate of change occuring during the tape transport operation to the greater, but correspondingly sloped, take-up reel peripheral velocity rate of change.

2. The apparatus of claim 1 wherein said constant braking means comprises a tensioned cord which engages said supply reel.

3. The apparatus of claim 2 wherein said tensioned cord is wrapped about and frictionally engages a shaft mounted on said supply reel.

4. The apparatus of claim 3 comprising a high force spring and a low force spring wherein said tensioned cord is secured at one end to a high force spring and at its other end to a low force spring.

5. The apparatus of claim 4 wherein said constant braking means is unidirectional with respect to said supply reel.

6. The apparatus of claim 5 wherein a mirror image of said constant braking means similarly comprising a cord and spring assembly engages said take-up reel thereby permitting bi-directional tape transport.

7. The apparatus of claim 6 wherein said high force spring interconnects the corresponding high-tension ends of said cords engaging said supply and take-up reels.

8. The apparatus of claim 7 wherein said low force spring interconnects the corresponding low-tension ends of said cords engaging said supply and take-up reels.

9. The apparatus of claim 8 wherein said low force spring is a wishbone-shaped leaf spring.

10. The apparatus of claim 8 wherein a stop, which acts as a ground point, engages said high force spring on the take-up reel side of said apparatus, thereby preventing the transmittal of any substantial force to said high-tension end of the cord engaging said take-up reel during the transport operation.

11. The apparatus of claim 10 wherein a stop, which acts as a ground point, engages said low force spring on the supply reel side of said apparatus, thereby preventing the transmittal of any substantial force to said low-tension end of the cord engaging said supply reel during the transport operation.

12. The apparatus of claim 11 wherein said constant braking means comprises a closed-loop system which exactly reverses its mirror image force components acting on the supply and take-up reel upon reversal of tape direction in a bi-directional tape transport apparatus.

13. The apparatus of claim 12 wherein said means for urging said supply and take-up reels against the peripheral surface of the capstan comprises a spring interconnecting movable carriages upon which said supply and take-up reels are mounted.

14. A method of generating constant tape tension in a tape transport system of the type wherein the supply and take-up reels are simultaneously driven by surface engagement with a capstan having a resiliently deformable peripheral surface, said method comprising:

urging the supply and take-up reels against the peripheral surface of the capstan thereby causing the peripheral velocity of said supply and take-up reels to increase above that of said capstan;

applying a constant braking force to said supply reel thereby generating bias and torque effects therein, the peripheral velocity of said supply reel being uniformly reduced throughout the tape transport operation by said bias effect and being reduced in direct proportion to the decreasing diameter of the tape wound thereon throughout the tape transport operation by said torque effect; and balancing said bias and torque effects so as to match the supply reel peripheral velocity rate of change occuring during the tape transport operation to the greater, but correspondingly sloped, take-up reel peripheral velocity rate of change.

* * * * *